Dec. 12, 1950　　W. W. GIERKE ET AL　　2,534,166
MEAT TENDERING MACHINE

Filed Sept. 27, 1947　　2 Sheets-Sheet 1

Inventors
Walter W. Gierke
Oscar E. Brownsey
Veryl F. Frye
By Spencer, Marzall, Johnston & Cook
Attys Dec. 12, 1950 W. W. GIERKE ET AL 2,534,166
MEAT TENDERING MACHINE
Filed Sept. 27, 1947 2 Sheets-Sheet 2

Inventors.
Walter W. Gierke
Oscar E. Brownsey
Veryl F. Frye
By Spencer, Marzall, Johnston & Cook
attys.

Patented Dec. 12, 1950

2,534,166

UNITED STATES PATENT OFFICE 2,534,166

MEAT TENDERING MACHINE

Walter W. Gierke, Oscar E. Brownsey, and Veryl F. Frye, La Porte, Ind., assignors to U. S. Slicing Machine Company, Inc., La Porte, Ind., a corporation of Indiana Application September 27, 1947, Serial No. 776,520

3 Claims. (Cl. 17—26)

This invention relates to meat tendering machines in general, and particularly to a meat tendering machine having a plurality of tendering knife assemblies comprising spaced knife blades arranged on spaced shafts. More specifically, the invention relates to means for mounting the knife blade assemblies removably to the machine.

An important object of the present invention is to provide new and improved releasable mounting means for knife blade assemblies of a meat tendering machine.

Another object of the invention is to provide releasable mounting means for the knife blade assemblies of a meat tendering machine, wherein the bearings for the knife blade assemblies may be moved to supported or released positions.

A further object of the invention is to provide releasable mounting means for the shafts of knife blade assemblies of a meat tendering machine, wherein the bearings which support one end of the shafts are mounted in supporting brackets for longitudinal sliding movement; one extreme position of the sliding bearings being a shaft supporting position and the other extreme position thereof being a shaft releasing position.

Still another object of the invention is to provide a new and improved form of releasable mounting means for the knife shafts of a meat tendering machine, wherein movably mounted bearing members may be locked in shaft supporting position, but may be unlocked and moved to shaft releasing position.

A still further object of the invention is the provision of new and novel releasable locking means for knife shaft assemblies, whereby the knife assemblies are locked removably in operative position but which are capable of being removed one at a time.

Other objects and advantages of the invention will become apparent upon reading the following description taken in conjunction with the accompanying drawings in which.

Figure 1:
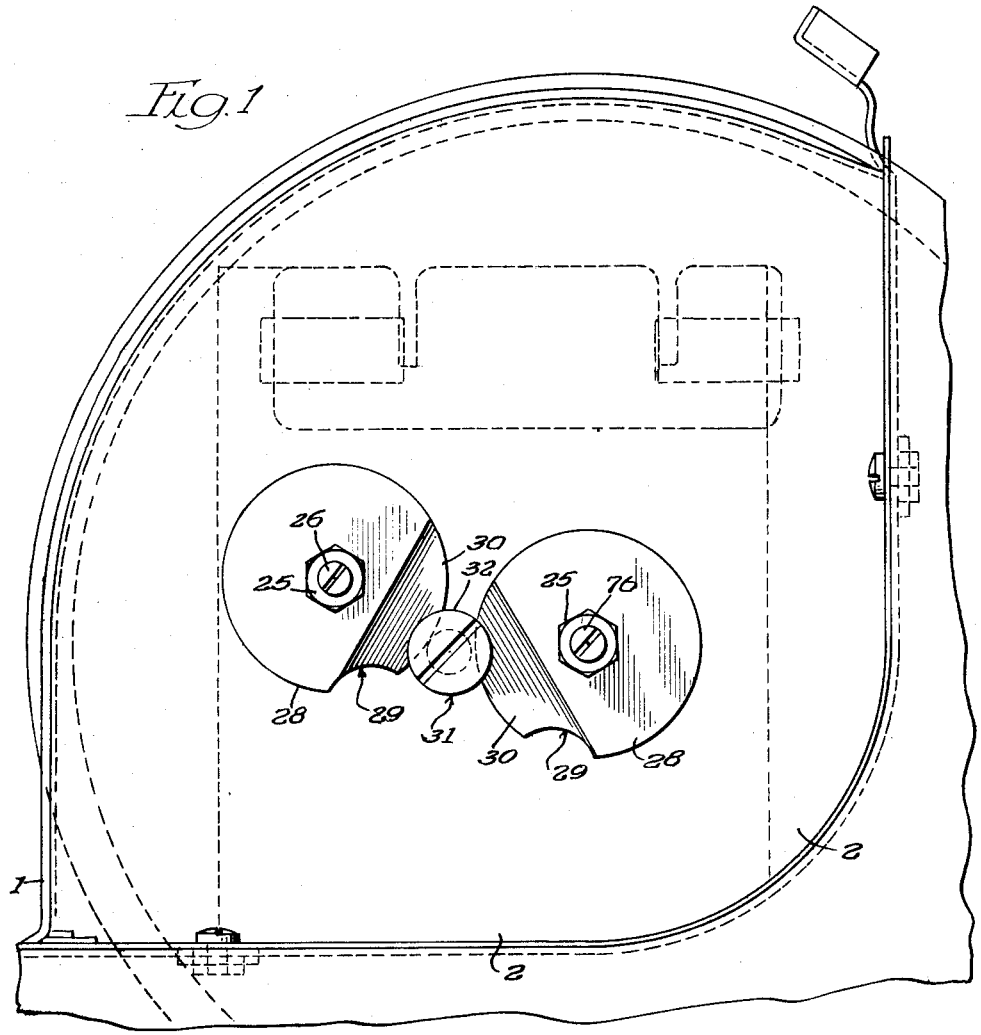
Fig. 1 is a fragmentary side elevational view of a meat tendering machine embodying the present invention and showing the releasable shaft supporting means in locked position.

The particular device herein disclosed for the purpose of illustrating the invention is shown applied to the knife blade assemblies of a meat tendering machine of the general type shown in Patent No. 2,409,463 to Arthur H. Ahrndt, and assigned to the present assignee.

Briefly described, the invention resides in an improved mounting means for the knife shafts of meat tendering machines and includes a slidably mounted bearing member adjacent one end of each of the shafts. The bearing members are mounted for longitudinal sliding movement in a supporting bracket of the machine. The bearing members are longitudinally bored to receive and support rotatably one end of a knife shaft when the bearing members are in their innermost position. Novel locking means are provided for locking the bearing members in shaft supporting position. The locking means is such that a rotation of the bearing members will release the bearing members for outward longitudinal sliding movement away from the knife shaft, whereupon the knife shaft may be removed quickly and easily.

Referring now more particularly to the drawings, the machine is provided with a housing 1 having a pair of spaced apart vertically extending brackets 2 (only one of said brackets being illustrated in the drawings). These spaced brackets 2 generally form mounting brackets for most of the operating mechanism of the food tendering machine which operates in a manner more fully described in the aforesaid patent to Ahrndt.

Two knife supporting shafts 3 are provided, there being one shaft 3 for each knife assembly. These shafts 3 extend between the supporting brackets 2 and are supported thereby. A plurality of circular knives 4 are positioned along the length of each shaft 3, each knife 4 preferably being provided with peripheral tendering teeth or cutting edges 5. A plurality of spacing collars 6 are also located along the length of each shaft 3 and separate the individual circular knives 4.

Figure 3:
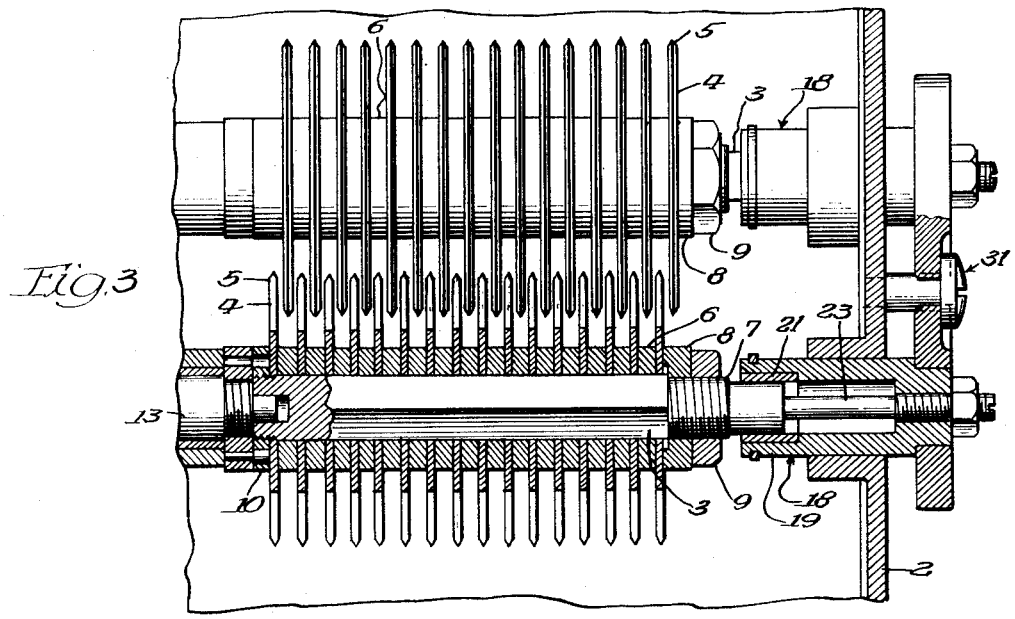
Fig. 3 is a fragmentary plan view of the knife blade assemblies in normal operative position, some of the parts being shown in section for the sake of clarity.
Figure 4:
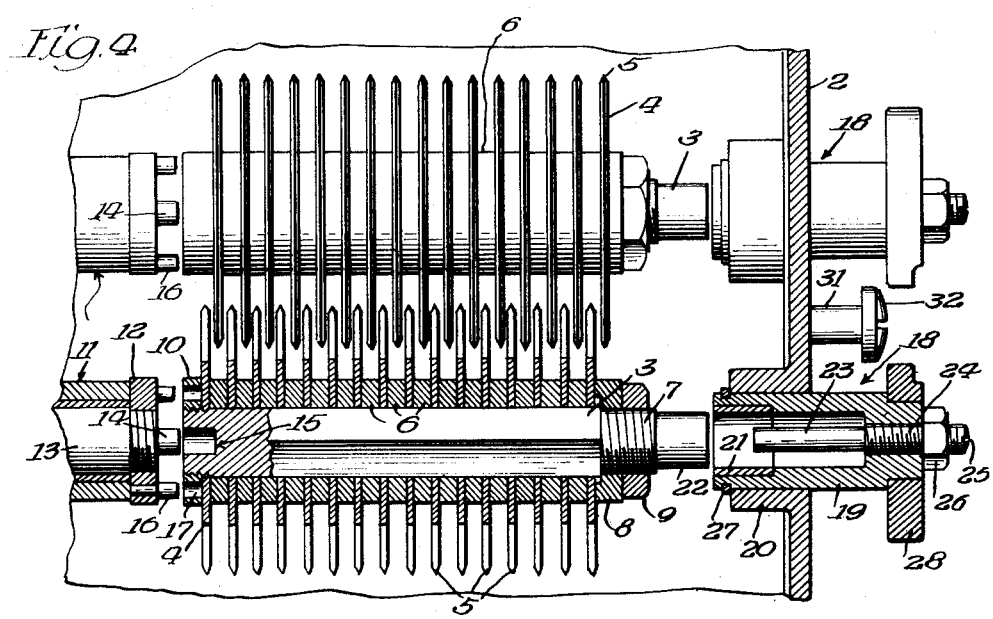
Fig. 4 is a view similar to Fig. 3 but showing the releasable shaft supporting means in shaft releasing position.
Figure 5:
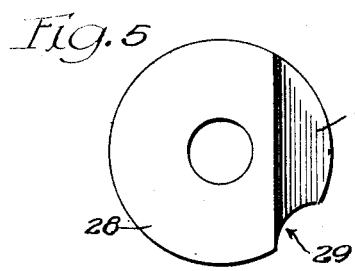
Fig. 5 is an elevational view of one of the locking knobs.
Figure 6:
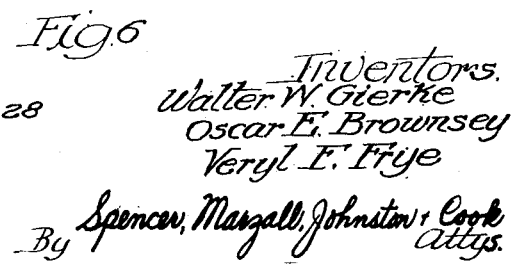
Fig. 6 is a side elevational view of the locking knob shown in Fig. 5.

One end of each knife supporting shaft 3 is threaded as at 7, Figs. 3 and 4, and a washer 8 and a nut 9 are received over the end of the shaft, the nut 9 threadedly engaging the end of the shaft 3 and urging the washer 8 against the outermost circular knife. The other end of a shaft 3 also is threaded externally and receives a collar 10 which bears against an outermost circular knife at the end of the shaft. Each knife assembly, which consists of a shaft 3, a plurality of spaced knife blades 4, and the spacing collars 6 mounted on the shaft, provides a unitary construction.

A drive bearing member 11 adjacent one end of each shaft 3 includes an outer collar 12 threadedly engaging a drive shaft 13. The drive shaft 13 has at least one central outwardly extending pin 14 which is adapted to be received in a complementary recess 15 formed in the end of the knife shaft 3, Fig. 4. A plurality of driving pins 16 extend axially of the drive shaft 13 and are spaced peripherally around the collar 12. These driving pins 16 are received in suitable cooperating aligned openings 17 in the collar 10 on the shaft 3, whereupon rotation of the shaft 3 and collar 12 will rotate the knife shaft 3 and the tendering knives mounted thereon. The plurality of driving pins 16 provide for greater strength in the driving connection between the shafts 13 and 3, and provide for easy registration with the openings 17.

The invention as illustrated herein is applied to a meat tendering machine provided with two knife shafts 3, and an identical releasable mounting means is provided at one end for each shaft of each knife blade assembly. The releasable bearing for the one end of each shaft 3 is indicated by the numeral 18. Each bearing 18 includes a bearing sleeve 19 which is mounted for longitudinal sliding movement in an annular inwardly extending flange 20 on the bracket 2. The inner end of the sleeve 19 is provided with a bearing bushing 21, and this bushing is adapted to receive the outer circular end 22 of a knife shaft 3. An adjustable threaded thrust bearing 23 extends longitudinally through the sleeve 19 and threadedly engages the threads 24 provided at the outer end of the sleeve 19. The outer end of the thrust bearing 23 is provided with a slot 25 for purposes of adjustment, and a lock nut 26 is provided to lock the thrust bearing in adjusted position. A retaining ring 27, located in an annular groove adjacent the inner end of the sleeve 19, extends radially outwardly beyond the surface of the sleeve 19 and acts as a stop member to limit the outward sliding movement of the bearing 18.

Thus far, it will be seen that the bearing member 18, when in its innermost position as illustrated in Fig. 3, will support rotatably one end of the knife shaft 3, while the other end of the shaft 3 is supported by the driving pins 16 in the driving bearing member 11. The bearing member 18 may then be moved to its outermost position as illustrated in Fig. 4, whereupon the knife shaft 3 and the tendering blades mounted thereon may be removed easily and quickly from the machine.

A novel form of locking means is also provided for locking each bearing member 18 in its shaft supporting position. Each locking means includes a knob secured to a bearing 18, the knob being in the form of a substantially flat disc 28 which is secured to the outer end of the sleeve 19, such as by means of a press-fit thereon. The periphery of the knob 28 has an arcuate cut-away portion 29 at a suitable location for a purpose which will be hereinafter described. The outer surface of the knob 28 also has a tapered wedge-shaped or cam-like surface or portion 30 which provides a tapered surface.

Figure 2:
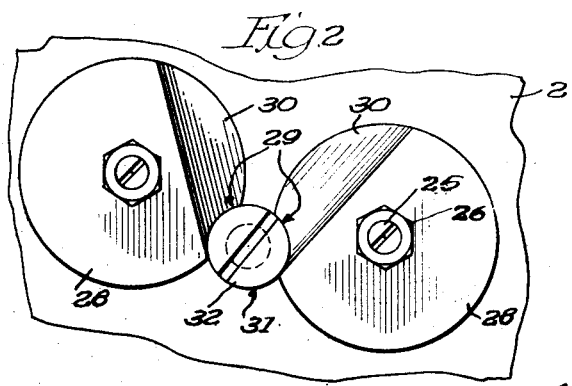
Fig. 2 is a fragmentary view similar to Fig. 1 but showing the locking means in unlocked position.

A headed set screw 31, having a head 32 thereon, extends outwardly from the outer surface of a bracket 2 and cooperates with the adjacent locking knobs 28 to form a locking device to lock the bearing members 18 in shaft supporting position. The bearing member 18 is rotatably mounted in the annular flange 20 so that a knob 28 may be rotated to a position where the cutaway or recessed portion 29 in the knob 28 will permit the knob to be moved past the head 32. This position of each knob is illustrated in Fig. 2. In this position it will be seen that the knobs, and the sleeves 19 to which they are secured, will be free to move inwardly and outwardly in the annular flange 20. When the bearing members 18 are in shaft supporting position as shown in Fig. 3, the knobs 28 may be rotated in opposite directions toward the headed member 31, whereupon the tapered surface 30 of each knob 28 will become wedged against the under surface of the head 32. The bearing members 18 will then be locked in shaft supporting position. This locked position of the knobs 28 is illustrated in Fig. 1.

Removal of either or both of the knife supporting shafts 3 is accomplished by merely rotating one or both of the knobs 28 in opposite rotative directions to a position where the cut-away portions 29 will coincide with the member 31, and thus permit outward movement of the bearing member past the head 32, Fig. 2. The bearing member 18 is thus free to be moved outwardly to the position shown in Fig. 4, whereupon the knife supporting shaft 3 is free to be moved toward the right to release its opposite end from the pin 14 and the driving pins 16 and thereupon permit removal of the shaft.

The foregoing construction permits easy and safe removal of one knife shaft at a time in a simple and efficient manner. This construction also provides for positive locking means to insure that the releasable mounting means will be retained in shaft supporting position during the driving of the knives and operation of the machine.

Changes may be made in the form, construction and arrangement of parts from that disclosed herein without in any way departing from the spirit of the invention or sacrificing any of the attendant advantages thereof, provided, however, that such changes fall within the scope of the claims appended hereto.

The invention is hereby claimed as follows:

1. In a machine of the class described, spaced supporting brackets, knife shafts having a plurality of knife blades thereon and extending between said brackets, bearing members rotatably and slidably mounted in one of said brackets for releasably supporting said shafts, said bearing members being slidable to shaft supporting and to shaft releasing positions, a locking knob on the outer end of each bearing member, and a headed member mounted on said last named bracket between said knobs and adjacent the periphery of said locking knobs, the underside of the headed member being spaced a predetermined distance from the outer surface of said bracket, whereby said knobs may be received within the space between the underside of said headed member and the surface of said bracket and bear against the under side of said headed member to lock said bearing members in shaft supporting position upon turning said knobs to predetermined positions.

2. In a machine of the class described, spaced supporting brackets, knife shafts having a plurality of knife blades thereon and extending between said brackets, bearing members rotatably and slidably mounted in one of said brackets for releasably supporting said shafts, said bearing members being slidable to shaft supporting and to shaft releasing positions, a locking knob on the outer end of each bearing member, a headed member mounted on said last named bracket between said knobs and arranged adjacent said locking knobs, the underside of the head of the headed member being spaced a predetermined distance from the outer surface of said bracket and overlying the periphery of said knobs, there being a peripheral recess formed in the periphery of said knobs to permit sliding movement of the knobs with respect to the head of said headed member, and a tapered wedge portion in the outer face of each of said knobs for engagement with the underside of the head, whereby rotation of said knobs in predetermined directions when the bearing members are in shaft supporting position will wedge the knobs against the under side of said headed member and lock the bearing members in shaft supporting position.

3. A meat tendering machine comprising spaced brackets, knife roll shafts between said brackets, and means demountably supporting said shafts, said means including bearing members slidably and rotatably mounted in one of said brackets, each of said bearings comprising a sleeve to receive a shaft end, an operating knob on each bearing, each knob having a recess formed in its periphery, a cam surface on the outer face of each knob, a headed pin projecting outwardly from said one bracket and arranged between the knobs adjacent the peripheries thereof, said pin including a head of larger diameter than the body of the pin with the underside of the head spaced from the bracket a distance less than the thickness of the knobs, said knobs being slidable along the head when the recesses are in registration with the headed pin, each of said knobs being turnable when the recesses are out of registration with the headed pin, turning movement of each knob when the knob is in a predetermined position causing the cam surface of the knob to engage behind the head of the headed pin to lock the knob in place.

WALTER W. GIERKE.
OSCAR E. BROWNSEY.
VERYL F. FRYE.

REFERENCES CITED

The following references are of record in the file of this patent:

UNITED STATES PATENTS

| Number | Name | Date |
|---|---|---|
| 2,364,533 | Jackson | Dec. 5, 1944 |
| 2,450,688 | Richard | Oct. 5, 1948 |